(12) United States Patent
Vartanian et al.

(10) Patent No.: US 11,728,646 B2
(45) Date of Patent: Aug. 15, 2023

(54) CONTROL OF ENERGY STORAGE TO REDUCE ELECTRIC POWER SYSTEM OFF-NOMINAL FREQUENCY DEVIATIONS

(71) Applicant: Battelle Memorial Institute, Richland, WA (US)

(72) Inventors: Charles K. Vartanian, Mukilteo, WA (US); Eric Hsieh, Arlington, VA (US); Md Jan E. Alam, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 310 days.

(21) Appl. No.: 16/891,133

(22) Filed: Jun. 3, 2020

(65) Prior Publication Data

US 2020/0389024 A1 Dec. 10, 2020

Related U.S. Application Data

(60) Provisional application No. 62/857,663, filed on Jun. 5, 2019.

(51) Int. Cl.
*H02J 3/00* (2006.01)
*H02J 3/38* (2006.01)
(Continued)

(52) U.S. Cl.
CPC ............ *H02J 3/001* (2020.01); *G05B 19/042* (2013.01); *H02J 3/381* (2013.01);
(Continued)

(58) Field of Classification Search
CPC ...... H02J 3/001; H02J 3/381; H02J 13/00002; H02J 2300/24; H02J 2300/28; H02J 3/241;
(Continued)

(56) References Cited

U.S. PATENT DOCUMENTS

| | | | |
|---|---|---|---|
| 2012/0049517 A1* | 3/2012 | Yasugi | H02P 9/10 290/44 |
| 2013/0197705 A1* | 8/2013 | Ray | H02J 3/241 700/295 |

(Continued)

OTHER PUBLICATIONS

Bhargava et al., "Application of an energy source power system stabilizer on the 10 MW battery energy storage system at Chino substation," *IEEE Transactions on Power Systems*, Feb. 1998, 13(1): pp. 145-151.

(Continued)

*Primary Examiner* — Charles R Kasenge
(74) *Attorney, Agent, or Firm* — Klarquist Sparkman, LLP

(57) ABSTRACT

A hybrid power generation system is formed by the combination of an energy storage system (ESS) and a rotating synchronous power generator (SPG). Energy is stored in or released from the ESS in response to measurements of the at least one angle parameter, selected from rotor, torque, or power angle of the SPG, to provide active frequency damping of electrical power output. The control of ESS energy exchange increases the stabilizing impact of the SPG inertia on the frequency of electricity in an electrical network or power grid. The hybrid power generation system can have an effective equal area criterion for stability limit that is greater than that of the SPG operating without the ESS. The hybrid power generation system can enable the electrical network to have a greater proportion of variable or distributed energy resource (DER) power generation systems without otherwise exceeding stability limits.

32 Claims, 8 Drawing Sheets

(51) Int. Cl.
*H02J 13/00* (2006.01)
*G05B 19/042* (2006.01)
(52) U.S. Cl.
CPC .......... *H02J 13/00002* (2020.01); *G05B 2219/2639* (2013.01); *H02J 2300/24* (2020.01); *H02J 2300/28* (2020.01)
(58) Field of Classification Search
CPC . H02J 3/28; G05B 19/042; G05B 2219/2639; Y02E 40/70; Y02E 60/00; Y02E 10/56; Y04S 10/123; Y04S 10/30; Y04S 10/14
See application file for complete search history.

(56) References Cited

U.S. PATENT DOCUMENTS

| | | | | |
|---|---|---|---|---|
| 2014/0070617 | A1* | 3/2014 | Detmers | H02J 13/00034 307/64 |
| 2014/0074311 | A1* | 3/2014 | Kearns | H02J 3/241 700/297 |
| 2016/0164444 | A1* | 6/2016 | Wei | H02P 9/105 322/19 |
| 2016/0179116 | A1* | 6/2016 | Bacque | H02J 3/24 700/298 |

OTHER PUBLICATIONS

Copp et al., "Power system damping control via power injections from distributed energy storage," *2018 International Symposium on Power Electronics, Electrical Drives, Automation and Motion (SPEEDAM)*, Jun. 2018, 6 pages.

Eriksson et al., "Synthetic inertia versus fast frequency response: a definition," *The Institution of Engineering and Technology (IET) Renewable Power Generation*, Sep. 2017, 8 pages.

Hsieh et al., "Sizing of battery energy storage for dynamic stability," *CIGRE Symposium Auckland*, 2013, Paper 513: pp. 0-9.

Neely, et al., "Damping of inter-area oscillations using energy storage," *General Meeting of the IEEE Power & Energy Society*, Jul. 2013, 5 pages.

North American Electric Reliability Corporation, "Potential bulk system reliability impacts of distributed resources," Aug. 2011 [online], 55 pages [retrieved on Mar. 6, 2020]. Retrieved from the Internet <URL: http://www.nerc.com/docs/pc/ivgtf/IVGTF_TF-1-8_Reliability-Impact-Distributed-Resources_Final-Draft_2011.pdf>.

Ogimoto et al., "Power oscillation damping by superconducting magnetic energy (SMES) storage unit," *Electrical Engineering in Japan*, 1994, 114(1): pp. 54-64.

Pacific Gas and Electric Company, "Electric Program Investment Charge Final Report," Feb. 20, 2019 [online], 106 pages [retrieved on May 27, 2020]. Retrieved from the Internet <URL: https://www.pge.com/pge_global/common/pdfs/about-pge/environment/what-we-are-doing/electric-program-investment-charge/PGE-EPIC-Project-2.05.pdf>.

Rahman et al., "Capturing generator rotor angle and field quantities—SDG&E experience and approach to using nontraditional generator measurements," *42nd Annual Western Protective Relay Conference*, Spokane, Washington, Oct. 2015, 10 pages.

Undrill, John, "Primary frequency response and control of power system frequency," Lawrence Berkeley National Laboratory, Energy Analysis and Environment Impacts Division, Feb. 2018, LBNL-2001105, 76 pages.

Wu et al., "Damping of power system oscillation by a superconducting magnetic energy storage unit," *Electric Power Systems Research*, 1991, 22: pp. 19-25.

Yao et al., "Adaptive power oscillation damping controller of superconducting magnetic energy storage device for interarea oscillations in power system," *Electrical Power and Energy Systems*, Dec. 2015, 78: pp. 555-562.

Zhu, Yongli, "Control and placement of battery energy storage systems for power system oscillation damping," PhD Dissertation [online], University of Tennessee, 2018, 115 pages [retrieved on Apr. 21, 2020]. Retrieved from the Internet: <URL: https://trace.tennessee.edu/utk_graddiss/5034>.

* cited by examiner

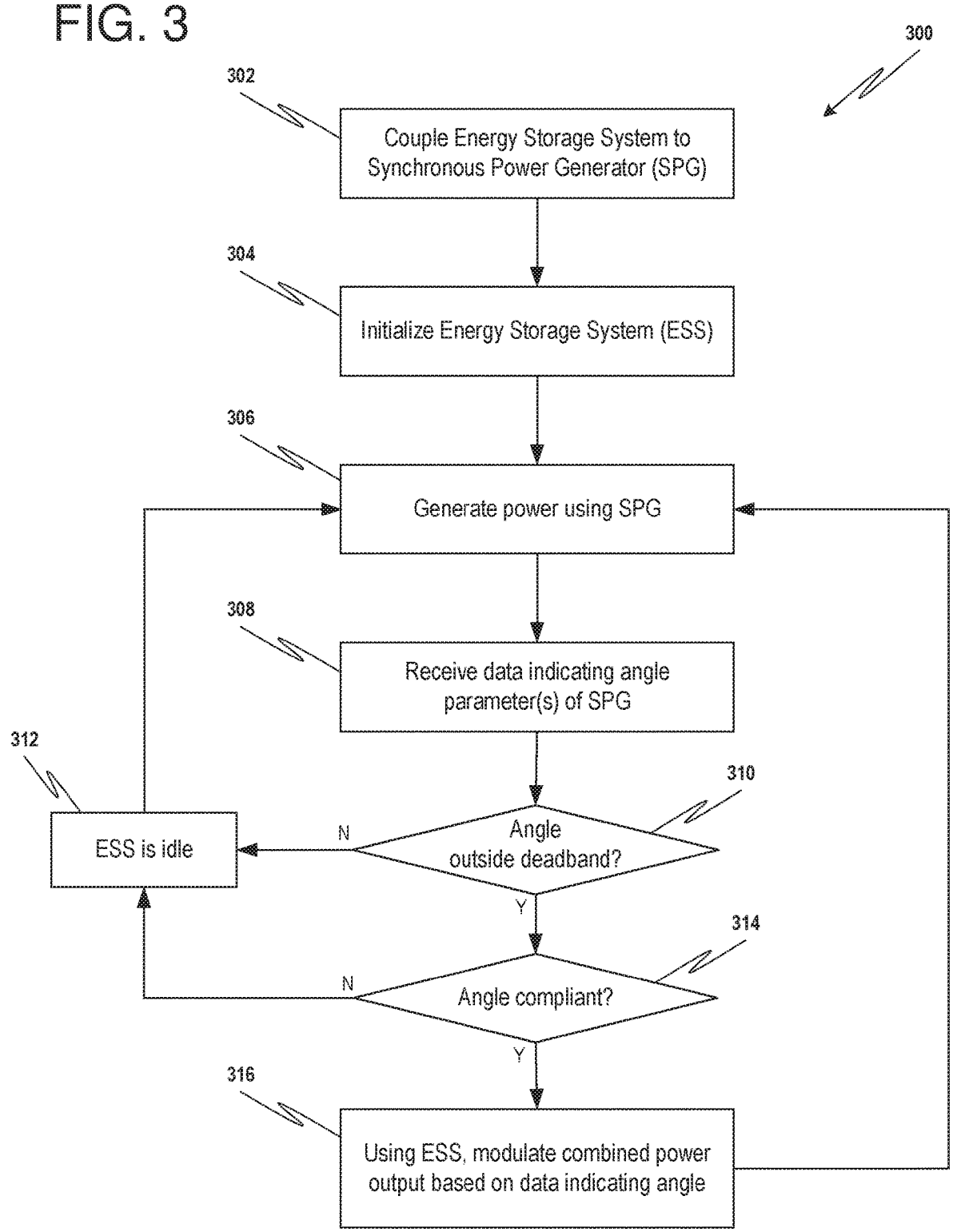

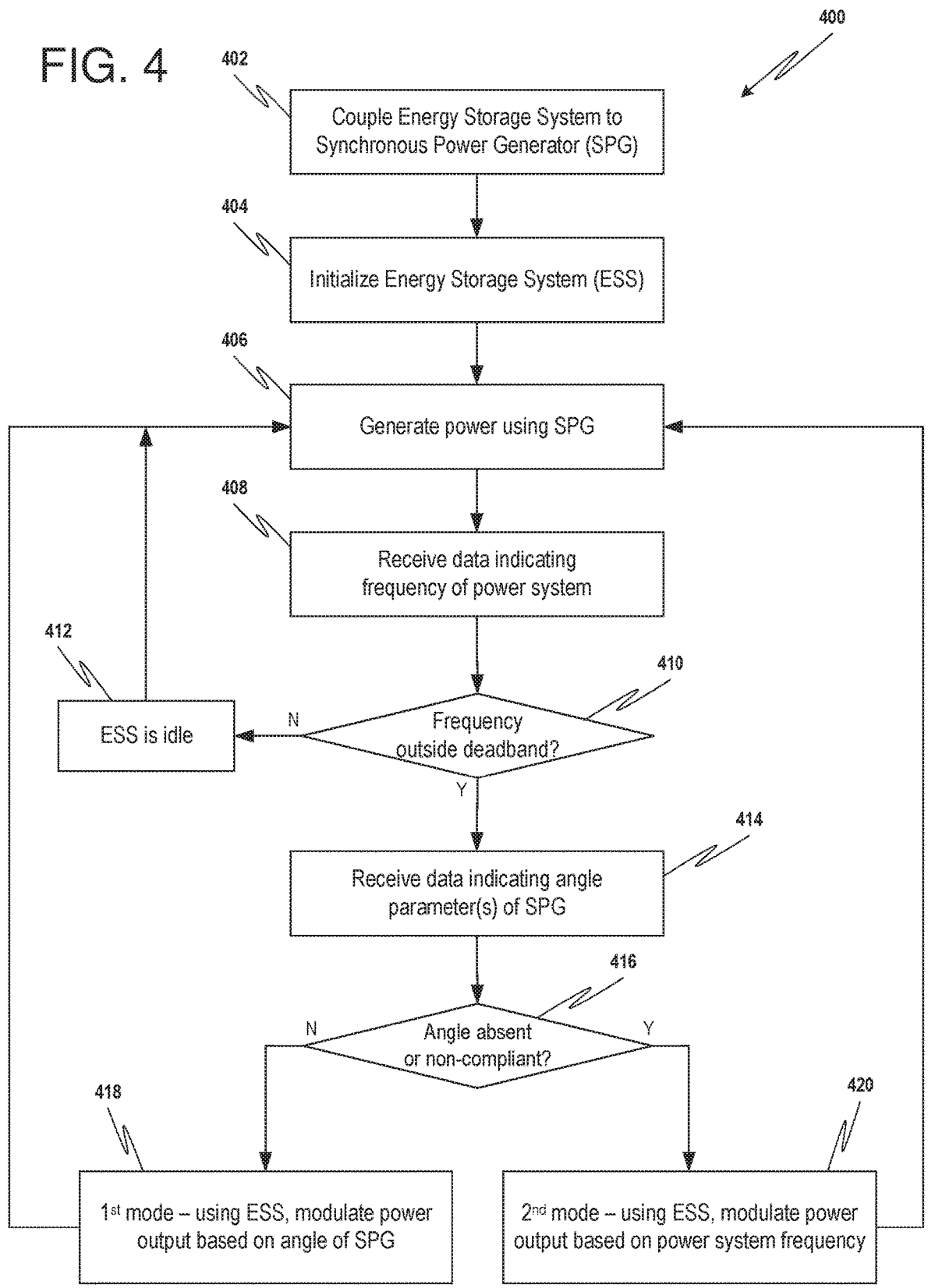

CONTROL OF ENERGY STORAGE TO REDUCE ELECTRIC POWER SYSTEM OFF-NOMINAL FREQUENCY DEVIATIONS

CROSS-REFERENCE TO RELATED APPLICATIONS

This application claims the benefit of U.S. Provisional Application No. 62/857,663, entitled "CONTROL OF ENERGY STORAGE TO REDUCE ELECTRIC POWER SYSTEM OFF-NOMINAL FREQUENCY DEVIATIONS," filed Jun. 5, 2019, which is incorporated by reference herein in its entirety.

ACKNOWLEDGMENT OF GOVERNMENT SUPPORT

This invention was made with Government support under Contract DE-AC05-76RL01830 awarded by the U.S. Department of Energy (DOE). The Government has certain rights in the invention.

FIELD

The present disclosure relates generally to electric power generation systems, and more particularly, to control of energy storage and transmission to control operational deviations of electric power generation systems.

BACKGROUND

Alternating current (AC) electric power generated by power generation systems can be transmitted to end users (e.g., power consumers or customers) via a power grid or electrical network, which includes transmission lines, substations, distribution lines, etc. The electrical network is designed to supply electricity at a relatively constant nominal frequency (e.g., 60 Hz in the North America). Temporal variations or disturbances within the network (e.g., failure of transmission lines or substations) or at input/output of the network (e.g., failure of a power generation system, or changes in user demand) can cause fluctuations in the nominal frequency of the supplied electricity. Historically, the majority of power generation systems coupled to the electrical network have been rotating synchronous generators, which provide physical inertia that helps to stabilize the frequency of electricity within the electrical network despite such disturbances.

Increasingly, electrical networks include renewable power generation systems (e.g., wind and photovoltaic) that produce power output of varying magnitude and/or timing. Modern electrical networks may also include distributed energy resources (DER), such as photovoltaic installations at a particular building or site. However, such variable and DER power generation systems may lack grid-stabilizing physical inertia or provide physical inertia substantially less than that of conventional rotating synchronous generators. Thus, as the percentage of electricity that is produced by rotating synchronous generators decreases, the electrical network may be more susceptible frequency destabilization after a disturbance.

Energy storage systems (ESSs) have been used to improve frequency stability by storing energy from or releasing energy to the electrical network. However, control of energy exchange between the ESSs and the electrical grid has employed droop-control schemes, where the exchange of energy is proportional to power system frequency. Yet the stabilization of network frequency using energy storage has not been widely implemented in industry, nor has there been a consensus on appropriate technical designs to achieve frequency stabilization using energy storage. Moreover, since conventional control of the ESS is based on frequency, the electrical network must deviate from nominal operating frequency before any energy storage or release is initiated, which may lead to delays in addressing system disturbances and/or undesirable oscillations around nominal frequency.

Embodiments of the disclosed subject matter may address one or more of the above-noted problems and disadvantages, among other things.

SUMMARY

Certain embodiments of the disclosed subject matter are directed to a hybrid power generation system formed by the combination of an energy storage system (ESS) and a rotating synchronous power generator (SPG). The hybrid power generation system can store energy in or release energy from the ESS based on operation of the rotating SPG in order to increase the stabilizing impact of SPG inertia on the frequency of electricity in an electrical network coupled to the hybrid power generation system. For example, energy exchange with the ESS can be controlled in response to measurements of at least one angle parameter (e.g., measurements of rotor angle, torque angle, and/or power angle) of the SPG to provide active frequency damping of the electrical power output of the SPG. In some embodiments, the control based on SPG angle parameter measurements may compensate for disturbances before frequency fluctuations arise or are detected in the electrical network. In some embodiments, the energy exchange with the ESS can be controlled in response to measurements of only one of the rotor angle, torque angle, or power angle. In some embodiments, the energy exchange with the ESS can be controlled in response to measurements of any two, or all, of the rotor angle, torque angle, or power angle.

While the ESS may be a static device with no rotation of its own, the ESS can be considered to add "synthetic inertia" to the SPG, thereby amplifying its stabilizing capacity and/or frequency damping ability. The combination of the ESS with the SPG can thus extend (e.g., increase) the effective equal area criterion for stability limit as compared to the SPG operating alone. Since frequency stabilization is improved by the hybrid power generation system, the electrical network may be able accommodate a greater percentage of variable (e.g., renewables) or DER power generation systems without otherwise exceeding stability limits.

In one or more embodiments, an apparatus can comprise an ESS and a control system. The ESS can be coupled to an output of an electrical power generator. The control system can have a signal output coupled to the ESS that causes the ESS to store or release energy based on at least one angle parameter, the angle parameter being selected from rotor angle, torque angle, or power angle of the electrical power generator.

In some embodiments, the control system can comprise one or more processors, an input/output interface, and a computer-readable storage. The input/output interface can be situated to control the energy storage system. The computer-readable storage can store computer-executable instructions that, when executed by the one or more processors, cause the one or more processors to collectively control the ESS to store or release energy based on the at least one angle parameter.

In some embodiments, the control system can be configured to control energy storage or release by the ESS to provide active frequency damping of electrical power output.

In some embodiments, the control system can be configured to control energy storage or release by the ESS so as to stabilize a frequency of electrical power output at a nominal value or within a frequency range around the nominal value.

In some embodiments, the ESS can comprise an inverter or flexible alternating current transmission system (FACTS) and at least one of a battery, a capacitor, a flywheel, a stationary power source (e.g., fuel cell), a pumped fluid storage, or a thermal energy storage.

In some embodiments, the electrical power generator can comprise at least one of a steam generator, a combustion turbine generator, a combined cycle generator, a hydroelectric generator, or a diesel or natural gas engine generator.

In some embodiments, the control system can have a signal input coupled to the electrical power generator to receive sensor signals indicative of the at least one angle parameter of the electrical power generator.

In some embodiments, the control system can be configured to control the ESS to store energy in response to a positive change of the at least one angle parameter over time, and to control the ESS to release stored energy in response to a negative change of the at least one angle parameter over time.

In some embodiments, the control system can be configured to control the ESS such that an amount of energy stored or release is a function of at least one of a magnitude of the at least one angle parameter, a difference between the magnitude of the at least one angle parameter and a nominal value, and/or a rate of change of the at least one angle parameter.

In some embodiments where the energy exchange with the ESS is controlled in response to two or more measurements, the control system is further configured to control the ESS additionally in response to a positive change, a negative change, a magnitude, or a difference in magnitude of: only one of the measurements, to two or more of the measurements, or all of the measurements.

In some embodiments, the ESS can be coupled to the output of the electrical power generator via a local bus.

In one or more embodiments, a method, for operating an ESS coupled to an electrical power generator, can comprise, in a first operation mode, controlling storage of energy in or release of stored energy from the ESS based on a measurement of at least one angle parameter, the angle parameter being selected from rotor angle, torque angle, or power angle of the electrical power generator.

In some embodiments, the controlling can provide active frequency damping of electrical power from the electrical power generator.

In some embodiments, the controlling can be such that a frequency of electrical power output from a combination of the ESS, and/or such that the electrical power generator is stabilized at a nominal value or within a frequency range around the nominal value.

In some embodiments, the ESS can comprise at least one of a battery, a capacitor, a flywheel, a stationary power source (e.g., fuel cell), a pumped fluid storage, or a thermal energy storage.

In some embodiments, the method can further comprise receiving at least one sensor signal from the electrical power generator or a power management unit thereof. The at least one sensor signal can be indicative of the at least one angle parameter, or can be indicative of changes of the at least one angle parameter over time. The controlling can be responsive to the at least one sensor signal.

In some embodiments, the controlling can comprise controlling the ESS to store energy in response to a positive change of at least one angle parameter during a measurement time interval, and/or controlling the ESS to release stored energy in response to a negative change of the at least one angle parameter during the measurement time interval.

In some embodiments, the controlling can be such that an amount of energy stored in or release from the ESS is a function of at least one of a magnitude of the at least one angle parameter, a difference between the magnitude of the at least one angle parameter and a nominal value, and/or a rate of change of the at least one angle parameter.

In some embodiments, the method can further comprise, in a second operation mode, controlling the storage of energy in or release of stored energy from the ESS based on power frequency variations in an electrical network coupled to the electrical power generator. The ESS can be operated in the second operation mode in response to an absence of the measurement of at least one angle parameter for the electrical power generator, or to the measurement of the at least one angle parameter being outside a predetermined range.

In some embodiments, in the second operation mode, the controlling can be such that an amount of energy stored in or release from the ESS is proportional to a frequency of the power in the electrical network or a difference between the frequency of the power and a nominal value.

In some embodiments, the method can further comprise, prior to initiation of the first operation mode, determining that a frequency of power in an electrical network coupled to the electrical power generator is outside of predetermined range.

In some embodiments, the electrical power generator can be a synchronous power generator comprising at least one of a simple cycle steam generator, a combustion turbine generator, a combined cycle generator, a hydroelectric generator, or a diesel or natural gas engine generator.

In one or more embodiments, a control system can comprise one or more processors and computer-readable storage media. The computer-readable storage media can store computer-instructions that, when executed by the one or more processors, cause the one or more processors to perform any of the disclosed methods for operating an ESS coupled to an electrical power generator.

In some embodiments, the instructions stored by the computer-readable storage media comprise instructions that cause the one or more processors to receive one or more signals indicative of the at least one angle parameter, or of changes in the at least one angle parameter over a time period.

In some embodiments, the instructions stored by the computer-readable storage media can further comprise instructions that cause the one or more processors to generate one or more first control signals for the ESS that cause the ESS to store energy in response to a positive change in the at least one angle parameter during the time period.

In some embodiments, the instructions stored by the computer-readable storage media can further comprise instructions that cause the one or more processors to generate one or more second control signals for the ESS that cause the ESS to release stored energy in response to a negative change in the at least one angle parameter during the time period.

In one or more embodiments, a hybrid power generation system can comprise an electrical power generator and a frequency damping unit. The electrical power generator can be configured to produce alternating current (AC) electrical power for an electrical network. The frequency damping unit can be coupled to the electrical power generator. The frequency damping unit can comprise an ESS and a controller. The controller can be configured to control the ESS to modulate a combined power output of the electrical power generator and the ESS based on at least one angle parameter, the angle parameter being selected from rotor angle, torque angle, or power angle of the electrical power generator.

In some embodiments, the electrical power generator can have a physical inertia, and the frequency damping unit can be configured to add synthetic inertia to the physical inertia of the electrical power generator.

In some embodiments, the synthetic inertia added by the frequency damping unit can act to stabilize a frequency of the combined power output at a nominal value of the electrical network or within a frequency range around the nominal value.

In some embodiments, an effective equal area criterion for stability limit of the hybrid power generation system is greater than an effective equal area criterion for stability limit of the electrical power generator operating without the frequency damping unit.

In some embodiments, the hybrid power generation system can further comprise one or more sensors configured to measure the at least one angle parameter of the electrical power generator and to generate one or more sensor signals in response to the at least one measured angle parameter. The controller can be configured to control the ESS based on the one or more sensor signals.

In some embodiments, the electrical power generator can be a synchronous power generator comprising at least one of a simple cycle steam generator, a combustion turbine generator, a combined cycle generator, a hydroelectric generator, a diesel engine generator, or a natural gas engine generator.

In some embodiments, the ESS can comprise at least one of a battery, a capacitor, a flywheel, a stationary power source (e.g., fuel cell), a pumped fluid storage, or a thermal energy storage.

In some embodiments, the controller can be configured to control the ESS to store energy in response to a positive change of the at least one angle parameter during a time period, and/or control the ESS to release stored energy in response to a negative change of the at least one angle parameter during the time period.

In some embodiments, the controller can be configured to control the ESS such that an amount of energy stored in or released by the ESS is a function of at least one of a magnitude of the at least one angle parameter of the electrical power generator, a difference between the magnitude of the at least one angle parameter and a predetermined value, and/or a rate of change of the at least one angle parameter.

In some embodiments, the frequency damping unit can be coupled to the electrical power generator by one or more local buses, and the electrical power generator can be coupled to the electrical network by one or more power transmission lines.

In one or more embodiments, an electrical power system can comprise one or more hybrid power generation systems, one or more variable or asynchronous (V/A) power generation systems, and an electrical network. The one or more hybrid power generation systems can be any of the disclosed hybrid power generation systems. The electrical network can be coupled to the hybrid and V/A power generation systems. The electrical network can be configured to transmit power from the power generation systems to one or more end users.

In some embodiments, each frequency damping unit can be coupled to the corresponding electrical power generator by one or more local buses, and/or each of the hybrid and V/A power generation systems can be coupled to the electrical network by one or more respective power transmission lines.

In some embodiments, the one or more V/A power generation systems can comprise at least one of a wind turbine or a photovoltaic device.

This summary is not intended to identify key features or essential features of the claimed subject matter, nor is it intended to be used to limit the scope of the claimed subject matter. Objects and advantages of embodiments of the disclosed subject matter will become apparent from the following description when considered in conjunction with the accompanying drawings.

BRIEF DESCRIPTION OF THE DRAWINGS

FIG. 3 is a process flow diagram of an exemplary method involving a hybrid generation system, according to a first embodiment of the disclosed subject matter.

FIG. 4 is a process flow diagram of an exemplary method involving a hybrid generation system, according to a second embodiment of the disclosed subject matter.

DETAILED DESCRIPTION

As renewable resources displace traditional synchronous generation, there may be times when there is insufficient system inertia to stabilize system frequency in the electrical network following a power system disturbance. Accordingly, embodiments of the disclosed subject matter provide a hybrid generation system that increases the inertial impact of a rotating synchronous power generator (SPG) and thereby increases the overall power system frequency stability. The hybrid generation system can include the SPG and an energy storage system (ESS) coupled thereto. The ESS can be controlled to store energy or release stored energy in response to operation of the SPG, for example, based on at least one measured angle parameter of the rotating SPG. As used herein, angle parameter refers to a parameter selected from rotor angle, torque angle, or power angle of the rotating SPG. Such control can improve the frequency stability of the hybrid generation system and/or the electrical network coupled thereto and/or reduce a time for the system frequency to recover from a disturbance. The combination of the ESS with the SPG can thus extend the effective equal area criterion for stability limit as compared to the SPG alone. Moreover, since frequency stabilization is improved by the hybrid power generation system, the electrical network may be able accommodate a greater percentage of variable (e.g., renewable resources) or distributed energy resource (DER) power generation systems without otherwise exceeding stability regulations.

Figure 1:
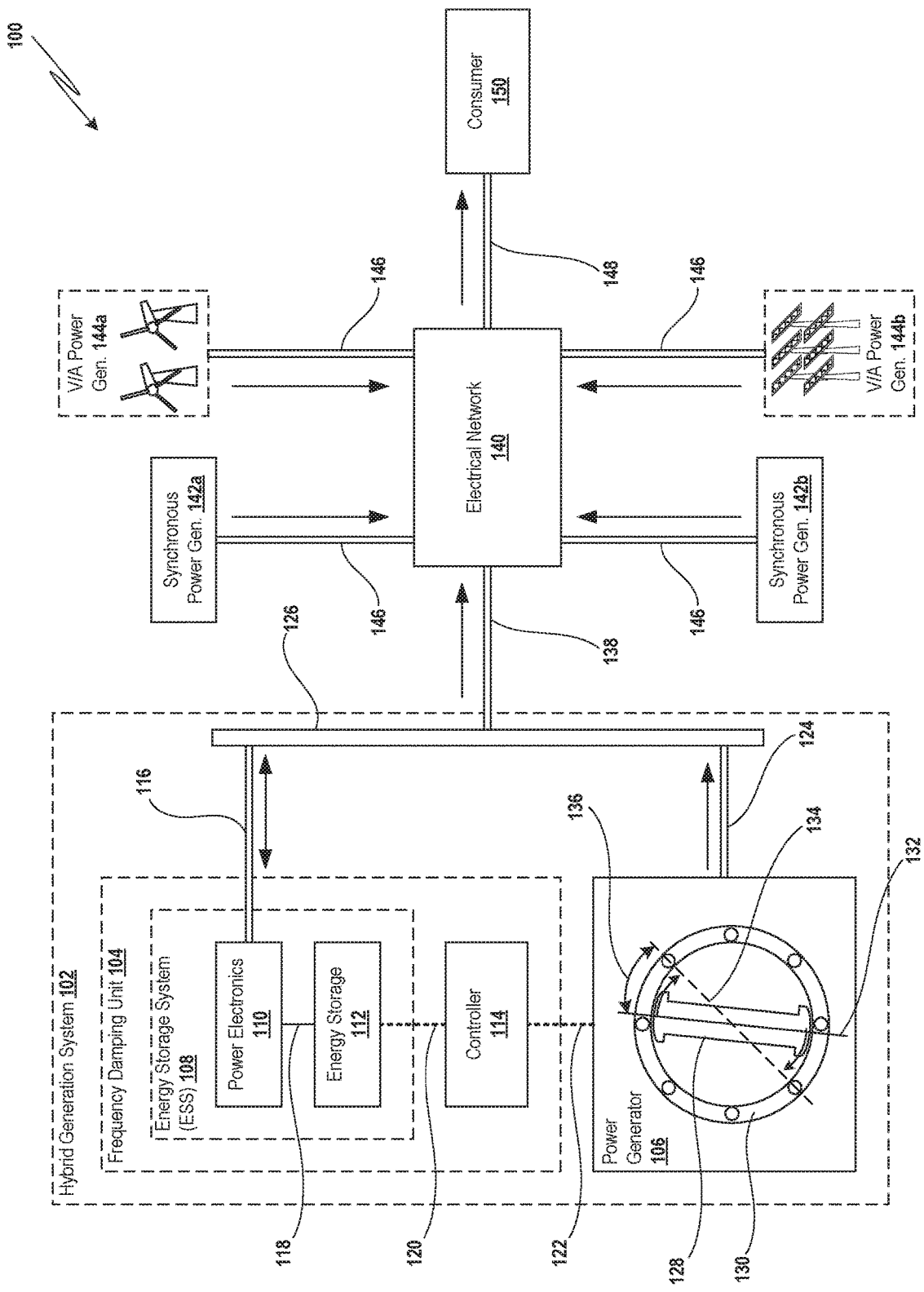
FIG. 1 is a simplified schematic diagram illustrating aspects of an exemplary hybrid generation system, according to one or more embodiments of the disclosed subject matter.

FIG. 1 illustrates an exemplary electric power system 100 that includes a hybrid generation system 102 according to one or more embodiments. The electric power system 100 includes an electrical network 140 (e.g., power grid) that conveys generated electricity to one or more power consumers or customers 150, for example, via a distribution line 148. In the illustrated example, the electrical network 140 receives electric power generated by rotating SPGs 142a, 142b via respective transmission lines 146 and electric power generated by variable or asynchronous (V/A) power generators 144a, 144b via respective transmission lines 146. For example, the V/A power generators can generate electric power using a renewable resource (e.g., wind turbines in 144a and solar photovoltaic in 144b) and/or be a DER system. The SPGs 142a, 142b can be conventional power generation systems, such as steam generators (e.g., fossil fuel, solar thermal, or geothermal), combustion turbine generators, combined cycle generators, hydroelectric generators, and diesel or natural gas engine generators. The electrical network can also receive electric power from the hybrid generation system 102 via transmission line 138. The hybrid generation system 102 can include a rotating SPG 106 and a frequency damping unit 104 electrically coupled thereto. The SPG 106 and/or SPGs 142a, 142b can be any type of conventional rotating power generation system, such as, but not limited to, simple cycle steam generators (e.g., fossil fuel, solar thermal, or geothermal), combustion turbine generators, combined cycle generators, hydroelectric generators, and diesel or natural gas engine generators.

In some embodiments, the SPG 106 and the frequency damping unit 104 of the hybrid generation system are in close proximity to each other so as to be co-located, e.g., provided at a same site or installation. Thus, electric power from both the SPG 106 and the frequency damping unit 104 can be provided to the electrical network 140 via the same transmission line 138. For example, SPG 106 can transmit generated electric power via an output power line 124 connected to local bus 126. Frequency damping unit 104 can also be connected to local bus 126 via input/output power line 116. The local bus 126 can be connected to transmission line 138 and thereby to the electrical network 140. Via power line 116, local bus 126, and transmission line 138, the frequency damping unit 104 can thus receive energy from the SPG 106 and/or the electrical network 140 for storage and release stored energy to the electrical network 140.

The frequency damping unit 104 can include an ESS 108 and a controller 114 operatively coupled thereto by signal line 120. The ESS 108 can include at least one energy storage 112 and at least one power electronics 110 connected to the energy storage 112 via power line 118. Each energy storage 112 can be a device capable of directly or indirectly storing electrical energy and of subsequently releasing stored energy as electricity. Each power electronics 110 can be a device capable of converting electrical power at system frequency (e.g., 60 Hz) for storage by energy storage 112 (e.g., DC voltage) and of converting stored energy from the energy storage 112 to electrical power at system frequency. The energy storage 112 and/or the power electronics can also have a relatively fast response time (e.g., less than is response time). For example, each energy storage 112 and power electronics 110 can have a response time on the order of 50 ms. In some embodiments, the energy storage 112 can include one or more of a battery (e.g., lithium battery), capacitor, flywheel, stationary power source (e.g., fuel cell), pumped fluid storage (e.g., pumped hydro storage or compressed air energy storage), or thermal energy storage. In some embodiments, the power electronics 110 can include one or more of an inverter (e.g., UL-1741-SA compliant) and a flexible AC transmission system (FACTS) device. Other types of fast-responding storage devices and grid-connecting power electronics are also possible according to one or more contemplated embodiments.

The controller 114 can be configured to dynamically control bi-directional energy exchange of the ESS 108 to provide frequency stabilization of the combined electric power output from hybrid generation system 102 to electrical network 140 and/or of the electric power within electrical network 140. For example, the controller 114 can control the ESS 108 to store energy in energy storage 112 or to release stored energy from energy storage 112 based on operation of SPG 106. In some embodiments, the controller 114 can receive one or more signals from a control or monitoring unit of the SPG 106, which signals provide an indication of operation of the SPG 106. For example, the controller 114 can receive signals from SPG 106 via signal line 122. In some embodiments, the controller 114 can directly monitor operation of the SPG 106, for example, where the controller 114 and the control unit of the SPG 106 are integrated together.

The SPG 106 may have one or more sensors that monitor operation thereof and generate one or more signals for use by controller 114 in controlling ESS 108. For example, the sensor(s) can monitor at least one angle parameter, such as rotor angle 136 of the SPG 106. Rotation of rotor 128 within stator 130 is used to generate the AC electric power output to power line 124 by SPG 106. The direction 132 of the rotating electric field of the rotor 128 is displaced from the direction 134 of the rotating electric field of the stator 130. The angle between the rotor electric field direction 132 and the stator electric field direction 130 defines rotor angle 136. In other embodiments, the SPG 106 may sense a surrogate variable that can be used to determine or estimate rotor angle 136. Alternatively or additionally, the sensor(s) can monitor torque angle (i.e., the angle between rotor flux and stator flux) or power angle (i.e., the angle between the center line of the excitation filed of the SPG and the center line of the reaction field of the stator). For a single rotating generator, however, the rotor, torque, and power angles are generally the same, and thus any or all of these angles can be used as the angle parameter(s) in controlling the energy exchange of ESS 108 by controller 114.

When the electrical network 140 is subjected to a system disturbance (e.g., failure of a power generator, change in consumer demand, failure of parts of the electrical network, etc.) that causes a deviation of the power system frequency from its nominal value, the deviation is reflected in a change of the angle parameter (e.g., rotor angle) of the rotating SPG. In some examples, the rotor angle of the rotating SPG may begin to change before power system frequency deviates from its nominal value. Using the angle parameter measurements from the SPG 106, the controller 114 can control ESS 108 to preemptively address the frequency deviations (e.g., eliminate frequency fluctuations or at least maintain fluctuations to within an acceptable range) and/or to quickly return the system to nominal frequency (e.g., minimize, or at least reduce, a time to return to nominal and/or a number of frequency oscillations about nominal).

Measurements for control by controller 114 can be time-synchronized and may have relatively high resolution (e.g., 30-40 measurements per second) to allow the hybrid generation system 102 to respond to disturbances in real-time or near real-time (e.g., less than is delay, and preferably less than 100 ms). For example, the controller 114 may also use synchrophasor technology, employing phasor measurement unit (PMU) data format, and can receive a time synchronization signal from a global positioning system (GPS) clock. Measurements of the angle parameter can be transmitted to the controller 114 in the PMU data format. In some embodiments, the controller 114 may also receive a signal indicative of system frequency, for example, when the ESS 108 is controlled to provide droop control. In such embodiments, the system frequency signal can also be in PMU data format.

The controller 114 can control ESS 108 to store energy in energy storage 112 or to release energy from energy storage 112 as a function of the angle parameter (e.g., rotor angle), a change in the angle parameter with respect to a nominal value or a deadband surrounding the nominal value, changes in the angle parameter over time, and/or a rate of change in the angle parameter over time. In some embodiments, the controller 114 controls energy exchange of ESS 108 proportional to a magnitude of angle parameter measurements or changes therein.

Alternatively or additionally, the controller 114 can be configured to employ proportional-integral (PI) or proportional-integral-derivative (PID) control based on the angle parameter(s) of the SPG 106. Other control schemes based on the angle parameter(s) of the SPG 106 are also possible according to one or more contemplated embodiments.

A system disturbance may cause oscillations of the rotor angle 136 about its nominal value and/or of the power system frequency about its nominal value. Control of the energy exchange of the ESS 108 by controller 114 can act to eliminate these oscillations, or at least reduce a number and/or magnitude of the oscillations. For example, the control of the energy exchange of the ESS 108 can be effective to increase a system frequency damping (e.g., as measured by increased effective inertia constant (H) or inertia (MW-s)) and/or to actively dampen oscillations so as to reduce undesirable oscillations about nominal frequency.

Figure 2A:
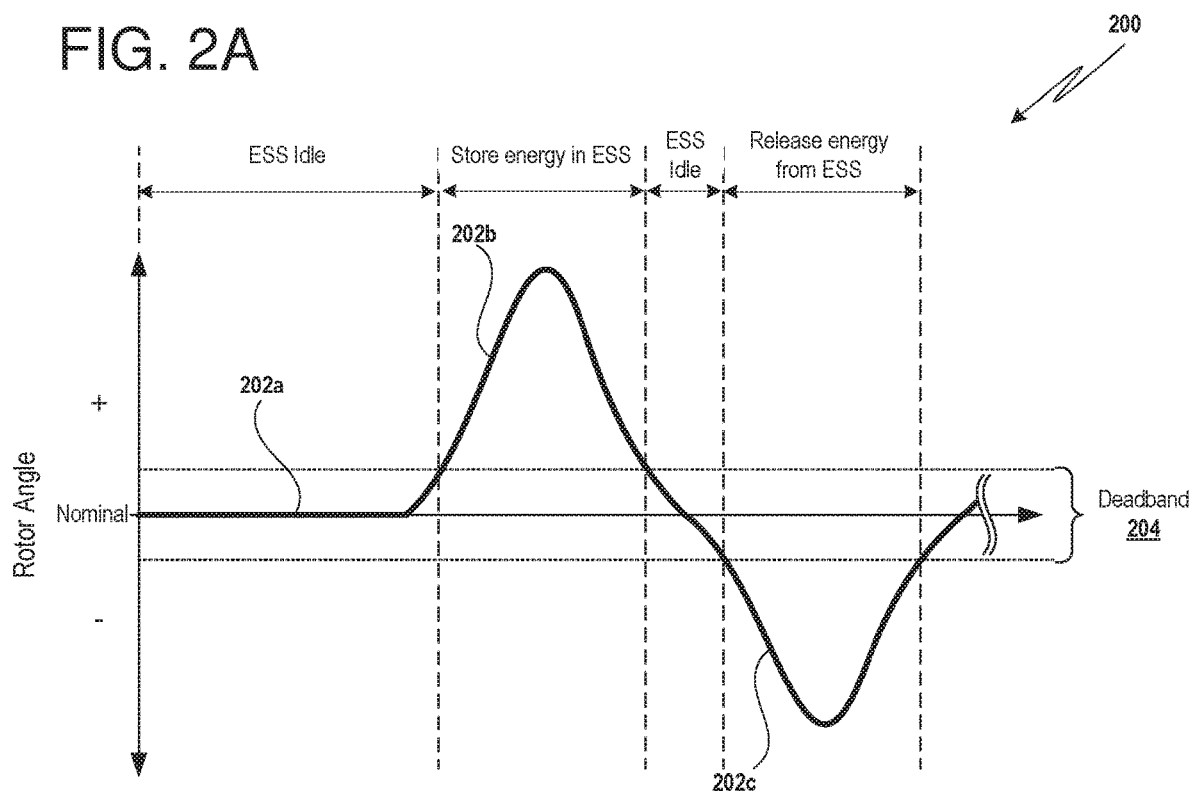
FIG. 2A is a graph that shows time variation of rotor angle of a power generation system and a generalized control scheme for an energy storage system, according to one or more embodiments of the disclosed subject matter.

For example, FIG. 2A is a graph 200 illustrating an example of rotor angle variations in response to a system disturbance and corresponding energy exchange of ESS 108. Before the disturbance, the rotor angle remains at a nominal value 202a or in a control deadband 204 surrounding nominal, and the ESS 108 can remain idle without any energy exchange. As SPG 106 initially attempts to compensate for the disturbance, the rotor angle strays from nominal into positive change territory, reflecting an excess of power generated by SPG 106. When the rotor angle increases out of control deadband 204 as shown at 202b, ESS 108 can be controlled to store excess energy from SPG 106, thereby allowing the rotor angle to move back toward nominal. As the frequency oscillates, the rotor angle may decrease past nominal into negative change territory, reflecting a lack of power generated by SPG 106. When the rotor angle decreases out of control deadband 204 as shown at 202c, ESS 108 can be controlled to release stored energy to compensate for the power deficit of SPG 106, thereby allowing the rotor angle to move back toward nominal. As long as the rotor angle is within the control deadband 204, ESS 108 may remain idle without any energy exchange. In some embodiments, the control deadband 204 may be eliminated or reduced in magnitude, such that any deviation of the rotor angle from nominal results in energy exchange of ESS 108. Alternatively or additionally, the ESS 108 may provide energy exchange despite the rotor angle being within the control deadband 204, for example, to provide droop control based on frequency deviations in electrical network 140 not otherwise reflected in the rotor angle changes (e.g., if SPG 106 is not operating or operating out of acceptable range).

Figure 2B:
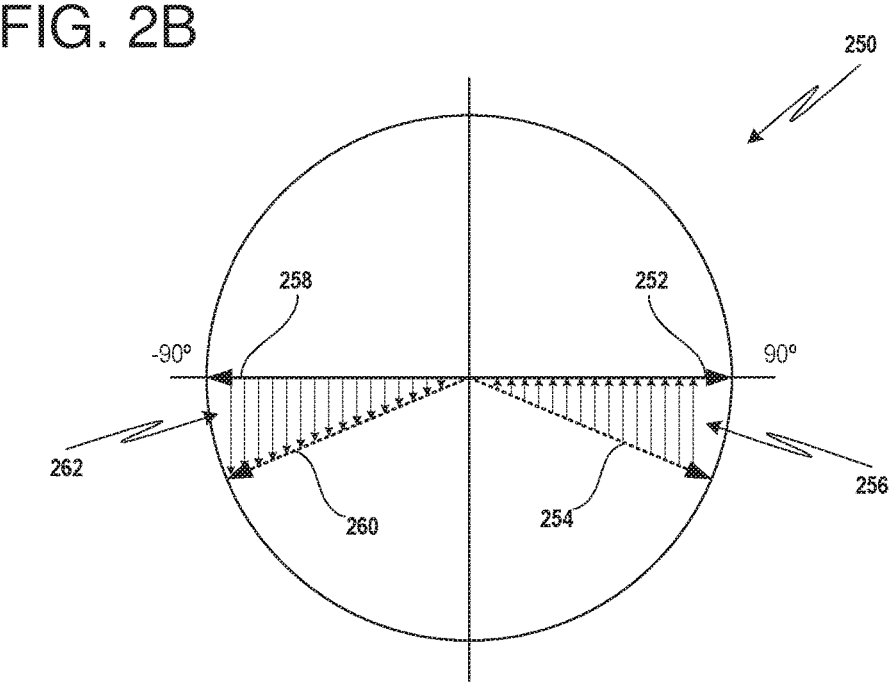
FIG. 2B illustrates the concept of extension of a power generation system's equal-area stability limits by operation of an energy storage system, according to one or more embodiments of the disclosed subject matter.

The hybrid generation system 102 can thus leverage the quick (e.g., less than 15 s, and preferably less than is), flexible (e.g., to store or release energy), and precise (e.g., to reliably control an amount of energy release or stored) energy exchange capabilities of ESS 108 to increase frequency stability (e.g., as measured by faster recovery of power system frequency to nominal following a power system disturbance) by working synergistically with a rotating SPG 106. The combination of the ESS 108 with the SPG 106 can extend the effective equal area criterion for stability limit as compared to the SPG 106 operating without the ESS 108. For example, FIG. 2B is a graph 250 illustrating rotor angle operational limits of an SPG, such as SPG 106. Normally, the SPG has a positive rotor angle limit 252 at +90° and a negative rotor angle limit 258 at −90°. If a power system frequency deviation caused the rotor angle to exceed either limit 252, 258, protective relays would disable the SPG to prevent system damage. However, the dynamic control of the ESS in response to angle parameters of the SPG increases the damping effectives of the SPG and extends the equal-area stability limit of the SPG. Thus, the positive rotor angle limit 252 is effectively extended to 254 by virtue of charging 256 (e.g., energy storage) of the ESS, and the negative rotor angle limit 258 is effectively extended to 260 by virtue of discharging 260 (e.g., energy release) of the ESS.

The controlled exchange of energy by ESS 108 can thus amplify the grid-stabilizing inertial impact of SPG 106 and may be considered to add "synthetic inertia" to the inertia of SPG 106. This synthetic inertia in turn increases the ability of the SPG to mitigate power system frequency disturbances. Increasing power system stability by adding synthetic inertia from appropriately-controlled ESS 108 can help address stability-based limitations to adding more renewable resources to power systems. Electric power system 100 can thus accommodate more V/A power generators (e.g., renewables) before hitting stability limits by increasing the stabilizing impact of a reduced proportion of rotating SPGs within the system.

As will be appreciated by one of ordinary skill in the art having the benefit of the present disclosure, the illustration of system 100 in FIG. 1 has been greatly simplified, and practical implementations of the various components of system 100 will be more complex. For example, practical implementations of an electrical network 140 could include a variety of transformers, transmission lines, subtransmission lines, substations, and distribution lines. Moreover, although only one consumer 150 is illustrated in FIG. 1, the system 100 can have a different number of consumers 150 coupled to the network 140 via the same distribution line 148 or via different distribution lines. For example, the network 140 can supply electricity to tens, hundreds, thousands, or millions of consumers 150. Although only five power generation systems are illustrated in FIG. 1 (e.g., hybrid system 102, SPGs 142a, 142b, and V/A power generators 144a, 144b), the system 100 can have a different number of power generation systems coupled to the network 140 via the same transmission lines or via different distribution lines. For example, the network 140 can receive electricity from tens, hundreds, thousands, or millions of power generation systems. Indeed, as noted above, the provision of hybrid generation systems 102 within system 100 can help to stabilize the frequency within electrical network 140, thereby allowing a greater percentage of the power generation systems coupled to the electrical network 140 to be V/A power generators than would otherwise be possible due to stability limits or regulations.

FIG. 3 shows an exemplary method 300 involving a hybrid generation system, for example, hybrid generation system 102. The method 300 can begin at process block 302, where an ESS is coupled to a rotating SPG. In some embodiments, the SPG is an existing power generator, and the ESS is coupled to the existing SPG to form a hybrid generation system. Alternatively or additionally, the SPG and ESS are constructed or installed together as a hybrid generation system. For example, the ESS can be coupled to the SPG in a manner similar to that discussed above with respect to ESS 108 and SPG 106 in FIG. 1, e.g., by connecting the SPG 106 and the ESS 108 to a common local bus 126. The ESS and the SPG may be provided at the same installation or site, so as to be considered co-located. In some embodiments, process block 302 can also include connecting a controller of the ESS to receive signals indicative of at least on angle parameter (e.g., rotor, torque, and/or power angle) of the SPG.

The method 300 can proceed to process block 304, where the ESS is initialized by storing an initial amount of energy from the SPG and/or from the electrical network. For example, a control module of the ESS, such as controller 114, can control the ESS to effect the initialization. Process block 304 can be such that the amount of energy stored in the ESS is less than its maximum capacity, for example, at about 50% of its capacity. Accordingly, the ESS can be immediately capable of either energy storage (e.g., charging) or release (e.g., discharging). Alternatively, the ESS may be initialized by fully charging or fully discharging, in which case, the ESS may only be capable of either energy release or energy storage, respectively, at the outset. Although process block 304 is illustrated as occurring after process block 302, it is also possible for process block 304 to occur before process block 302 (e.g., when the ESS is partially or fully charged prior to coupling to the SPG).

The method 300 can proceed to process block 306, where the SPG is operated to generate electric power. For example, the rotating SPG can be at least one of a simple-cycle steam generator, a combustion turbine generator, a combined cycle generator, a hydroelectric generator, or a diesel or natural gas engine generator. A rotor within a stator of the SPG can be driven to generate AC electric power, which can then be output to a local bus for transmission to the electrical network.

The method 300 can proceed to process block 308, where data indicative of at least one angle parameter of the SPG during the electric power generation is received. For example, the data can be received by a control module of the ESS, such as a controller 114. In some embodiments, the data indicative of the at least one angle parameter is received via signal(s) directly from one or more sensors that monitor a rotor angle of the SPG. Alternatively or additionally, a control module of the SPG may monitor rotor angle as part of operation or management of the SPG and can send signal(s) to the control module of the ESS providing the rotor angle data. In some embodiments, the data received in process block 308 can instead be data indicative of torque angle or power angle of the rotating SPG, or can be data of a surrogate variable used to determine or estimate rotor angle, torque angle, or power angle.

The method 300 can proceed to process block 310, where the data indicative of at least one angle parameter can be compared to a control deadband to determine if the angle parameter is outside of the control deadband. The control deadband may provide a buffer around the nominal value (e.g., normal operating value) of the angle parameter to avoid unnecessarily responding to normal or expected variations in the angle parameter. For example, the control deadband may be ±1° with respect to the nominal rotor angle. In other embodiments, the control deadband can be reduced or eliminated, such that the system can respond to all variations of the angle parameter. If the angle parameter is determined to be within the control deadband, the method 300 can proceed to process block 312, where the ESS is controlled to be idle (e.g., no current energy exchange, although it may continue to store previously received energy). The method 300 can thus return to process block 306.

Otherwise, if the at least one angle parameter is determined to be outside the control deadband at process block 310, the method 300 can proceed to process block 314, where the data indicative of the at least one angle parameter can be compared to operational limits to determine if the angle parameter is compliant. For example, the operation of the SPG may become unstable when the rotor angle exceeds 90°, and the system may consider rotor angles greater than or equal to 90° to be non-compliant. If the angle parameter is determined to be non-compliant, the method 300 can proceed to process block 312, where the ESS is again controlled to be idle. The method can then return to process block 306.

Otherwise, if the at least one angle parameter is determined to be compliant at process block 314, the method 300 can proceed to process block 316, where the ESS is controlled to modulate the power output of the hybrid generation system (e.g., the combined outputs of the ESS and the SPG) based on the data indicative of the least one angle parameter. The power output modulation by the ESS involves release of stored energy to the electrical network or storing energy from the SPG and/or the electrical network. For example, the energy exchange by the ESS can be a function of a magnitude of the angle parameter, a difference between the magnitude of the angle parameter and a nominal value for the angle parameter, a rate of change of the angle parameter, or any combination thereof. In some embodiments, an amount of energy stored in or released from the ESS is directly proportional to measured rotor angle values or changes therein. Alternatively or additionally, the control of the ESS energy exchange can employ PI-based or PID-based control schemes. Other control schemes based on the angle parameter(s) are also possible according to one or more contemplated embodiments.

Figure 5:
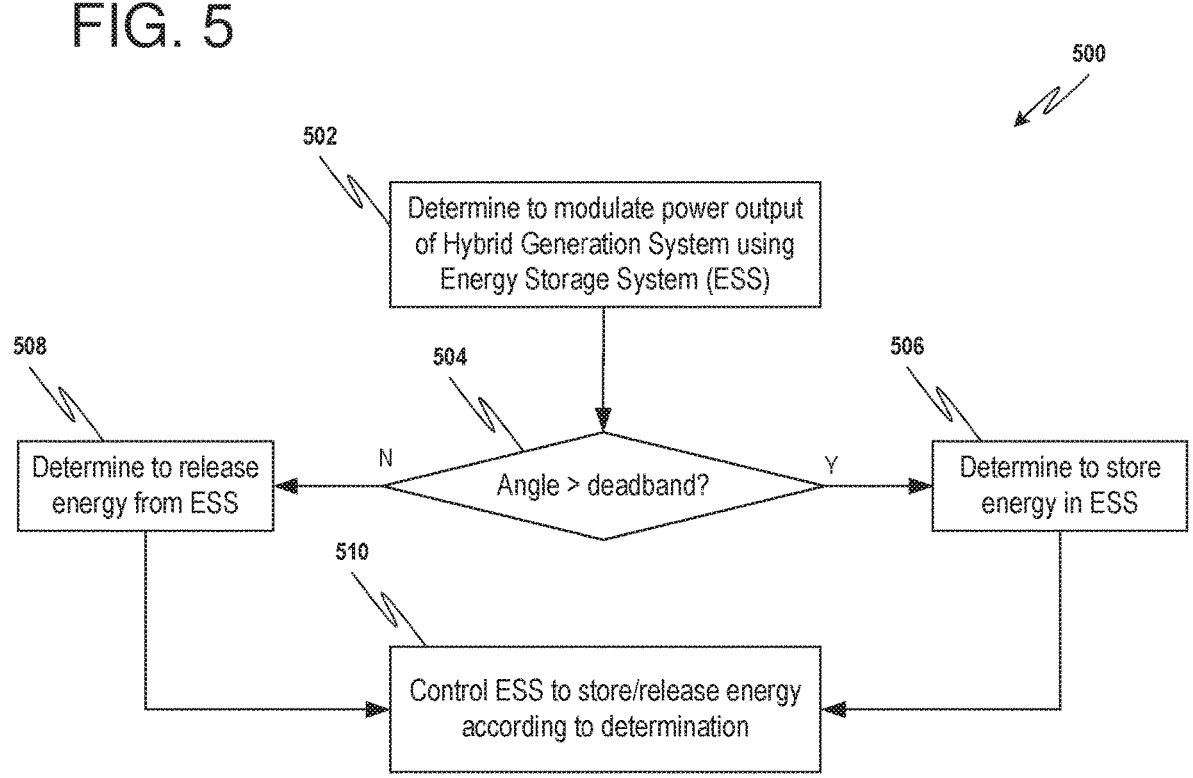
FIG. 5 is a process flow diagram of an exemplary control method for an energy storage system, according to one or more embodiments of the disclosed subject matter.

For example, FIG. 5 shows an exemplary method 500 for control of energy exchange of an ESS based on angle parameter measurements, which method 500 can be employed at process block 316 in method 300. The method 500 can initiate at process block 502, where it is determined to modulate power output of the hybrid generation system using the ESS, for example, based on process blocks 310, 314. The method 500 can then proceed to process block 504, where it is determined if the at least one angle parameter (e.g., rotor angle) is greater than the control deadband about the nominal angle parameter (e.g., a positive change in rotor angle from nominal). Alternatively, when there is no control deadband, the determination may be with respect to the nominal angle parameter. If the angle parameter is determined to be greater than the control deadband at process block 504, the method 500 can proceed to process block 506, where it is determined to store an amount of energy in the ESS. Otherwise, if the angle parameter is less than the control deadband at process block 504, the method 500 can proceed to process block 508, where it is determined to release an amount of stored energy from the ESS. Note that the option for the angle parameter being within the deadband is not illustrated in FIG. 5, as the ESS may be controlled to be at idle (e.g., not modulating the power output) when the angle parameter is within the deadband. As referenced above, the amount of energy stored in the ESS or released from the ESS may be a function of (e.g., directly proportional, nonlinear, etc.) of a magnitude of the angle parameter, a magnitude of a change of the angle parameter with respect to a nominal value, a magnitude of a change of the angle parameter in a given measurement time period, and/or a magnitude of a rate of change of the angle parameter. The method 500 can then proceed to process block 510, where the ESS is controlled to store or release the determined amounts of energy based on the respective determinations at either process block 506 or process block 508. In method 500, process blocks 502-510 may be performed by a controller of the ESS, for example, controller 114 in FIG. 1, or by a controller of the hybrid generation system shared by the ESS and the SPG.

Returning to FIG. 3, the method 300 can return to process block 306 from process block 316 to repeat process blocks 306-316. Although FIG. 3 illustrates a particular order for process blocks 302-316, embodiments of the disclosed subject matter are not limited thereto. Indeed, in certain embodiments, process blocks may occur in a different order than illustrated or simultaneously with other process blocks. For example, the generation of power by SPG at process block 306 may be a substantially continuous process (e.g., interrupted only for periodic maintenance) and thus can occur at a same time as the receiving data 308, determinations 310, 314, and ESS idling 312 or ESS power modulation 316.

The control of the ESS to modulate combined power output of the hybrid power generation system based on at least one angle parameter of the rotating SPG can provide active damping to stabilize a frequency of the power produced by the SPG and/or power with an electrical network connected to the hybrid power generation system. In some embodiments, the control of the ESS energy exchange based on the angle parameter(s) of the rotating SPG can allow the hybrid generation system to begin compensating for a disturbance before the power system frequency deviates from nominal or is otherwise detectable. In contrast, conventional systems monitor power frequency (or surrogates for frequency, such as rotor angle speed) and can only respond once the frequency deviates from nominal. Thus, the hybrid power generation system may be able to respond to respond to disturbances quicker and/or with fewer oscillations about nominal as compared to conventional systems. Moreover, the increased frequency stability offered by the hybrid generation system can allow the electrical network to include more V/A power generation systems than would otherwise be possible due to stability limitations or regulations.

In some embodiments, the ESS can also be controlled to store or release energy based on frequency, for example, when the corresponding rotating SPG is not operating (e.g., offline for maintenance) or when the angle parameter is non-compliant (e.g., greater than or equal to 90°). In such embodiments, the ESS can be controlled to implement droop control (e.g., dP/dF, where P is the electrical power and F is frequency). For example, FIG. 4 shows another exemplary method 400 involving a hybrid generation system (e.g., system 102) that can provide both angle-parameter-based control and droop control. The method 400 can begin at process block 402, where an ESS is coupled to a rotating SPG to form the hybrid generation system. The coupling 402 may be in a manner similar to that discussed above for process block 302 in FIG. 3. The method 400 can proceed to process block 404, where the ESS initialized by storing an initial amount of energy from the SPG and/or from the electrical network. Again, process block 404 may be in a manner similar to that discussed above for process block 304 in FIG. 3, and may occur before process block 402 (e.g., when the ESS is partially or fully charged prior to coupling to the SPG). The method 400 can proceed to process block 406, where the SPG is operated to generate electrical power. Process block 406 may be in a manner similar to that discussed above for process block 306 in FIG. 3.

The method 400 can proceed to process block 408, where data indicative of power system frequency (e.g., frequency of power generated by the SPG and/or power within the electrical network connected to the SPG) is received. For example, the power system frequency data can be received by a control module of the ESS (such as controller 114), by a control module of the SPG, or by a control module shared by the ESS and SPG. For example, the power system frequency data can be based on wide area measurement systems including synchrophasors. In some embodiments, the power system frequency data can be generated by one or more sensors that monitor power in a component within the electrical network (e.g., transmission line, subtransmission line, substation, etc.) or a transmission line connecting the SPG to the electrical network. Such sensors can send a signal to the corresponding control module that indicates the measured power system frequency. In some embodiments, power system frequency may be independently monitored by a separate system, such as a monitor/management system of a power plant installation that includes the SPG or a monitor/management system of the electrical network. The separate system can send a signal to the corresponding control module that provides an indication of power system frequency.

The method 400 can proceed to process block 410, where the data indicative of power system frequency can be compared to a frequency control deadband to determine if the frequency is outside of the frequency control deadband. The frequency control deadband may provide a buffer around the nominal value (e.g., normal operating value) of power system frequency to avoid unnecessarily responding to normal or expected variations in frequency. For example, the frequency control deadband may be ±0.1 Hz with respect to the nominal frequency (e.g., 60 Hz in North America). In other embodiments, the frequency control deadband can be reduced or eliminated, such that the system can respond to all variations of the power system frequency. If the power system frequency is determined to be within the frequency control deadband, the method 400 can proceed to process block 412, where the ESS is controlled to be idle (e.g., no current energy exchange, although it may continue to store previously received energy). The method 400 can thus return to process block 406.

Otherwise, if the power system frequency is determined to be outside the control deadband at process block 410, the method 400 can proceed to process block 414, where data indicative of at least one angle parameter of the SPG during the electric power generation is received. Process block 414 may be in a manner similar to that discussed above for process block 308 in FIG. 3. The method 400 can proceed to process block 416, where the angle parameter data can be evaluated to determine if the angle parameter is compliant. For example, the operation of the SPG may become unstable when the rotor angle exceeds 90°, and the system may consider rotor angles greater than or equal to 90° to be non-compliant. Alternatively or additionally, the data received at process block 414 may indicate that the SPG is not operating (e.g., if the SPG is undergoing maintenance). If the angle parameter is determined to be compliant and the SPG is operating, the method can proceed to process block 418, where the ESS is controlled to operate in a first mode. In the first operation mode, the ESS can modulate the power output of the hybrid generation system (e.g., the combined outputs of the ESS and the SPG) based on the data indicative of the at least one angle parameter. Process block 418 may be in a manner similar to that discussed above for process block 316 in FIG. 3 and method 500 in FIG. 5.

Otherwise, if the at least one angle parameter is determined to be non-compliant or if the SPG is not operating, the method can proceed to process block 420, where the ESS is controlled to operate in a second mode. In the second operation mode, the ESS can modulate the power output of the hybrid generation system based on the data indicative of power system frequency. The power output modulation by the ESS involves release of stored energy to the electrical network or storing energy from the SPG and/or the electrical network. The energy exchange by the ESS can employ droop control (dP/dF) in a manner similar to conventional systems. For example, the ESS can be controlled to release energy to the electrical network in response to data indicating a decrease in frequency from the nominal value, and the ESS can be controlled to store energy from the SPG and/or the electrical network in response to data indicating an increase in frequency from the nominal value. Other control schemes based on the frequency are also possible according to one or more contemplated embodiments.

In certain embodiments, the method 400 can return from either process block 418 or process block 420 to process block 406 in order to repeat process blocks 406-420. Although FIG. 4 illustrates a particular order for process blocks 402-420, embodiments of the disclosed subject matter are not limited thereto. Indeed, in certain embodiments, process steps may occur in a different order than illustrated or simultaneously with other process steps. For example, the generation of power by SPG at process block 406 may be a substantially continuous process (e.g., interrupted only for periodic maintenance) and thus can occur at a same time as the receiving frequency data 408, receiving angle parameter data 414, determinations 410, 416, and ESS idling 412 or ESS power modulations 418, 420.

Figure 6:
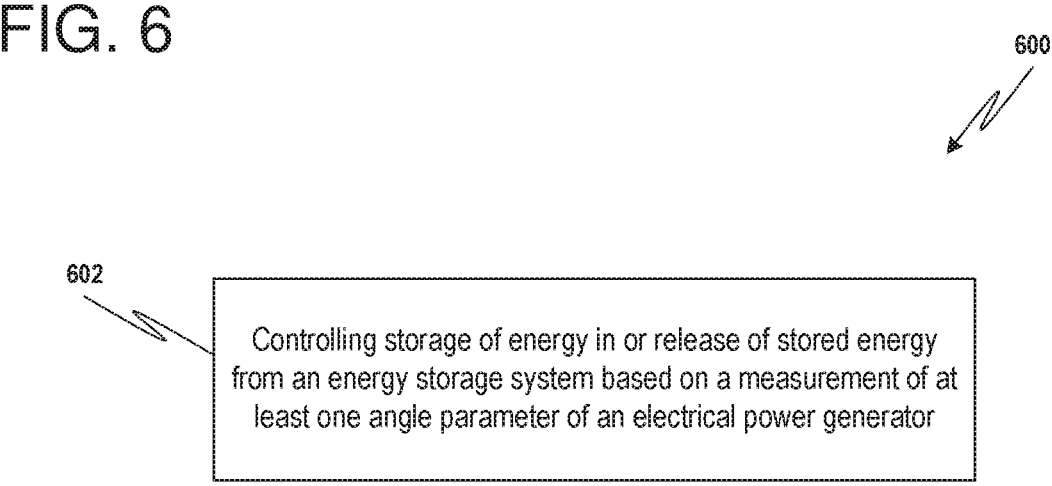
FIG. 6 is a process flow diagram of another exemplary control method for an energy storage system, according to one or more embodiments of the disclosed subject matter.

FIG. 6 shows an exemplary method 600 for control of ESS, for example, control of ESS 108 by controller 114 in FIG. 1. The method 600 includes an act 602 of controlling storage of energy in or release of stored energy from the ESS based on a measurement of at least one angle parameter (e.g., rotor angle, torque angle, and/or power angle) of an electrical power generator, for example, rotating SPG 106 in FIG. 1. For example, ESS control 602 can be in a manner similar to that described above with respect to any of FIGS. 3-5.

In the above discussed embodiments and examples, the controlled exchange of energy by the ESS with the electrical network can amplify the grid-stabilizing inertial impact of the associated SPG, thereby improving recovery of the power system frequency following a disturbance. The ESS control scheme based on angle parameter(s) of the SPG can, in theory, provide as much as a 26-fold increase in system frequency damping (e.g., reduction in unwanted oscillations around nominal frequency) as compared to the SPG alone. The controlled power exchange by the ESS can extend the stability range of the rotating SPG, based on the equal area curve criteria. If the equal area curve is exceeded, the power angle of the SPG will exceed 90°. Typically, out-of-step protective relays will trip (e.g., disable) the SPG before this limit is reached. However, by extending the equal-area region of the SPG and accordingly its stable operating regime, grid-connected SPGs with their stabilizing inertia can extend fault ride through (FRT) operations when needed most for system frequency deviation recovery, e.g., when they would otherwise trip before losing synchronism with the perturbed and oscillating power system.

Figure 7A:
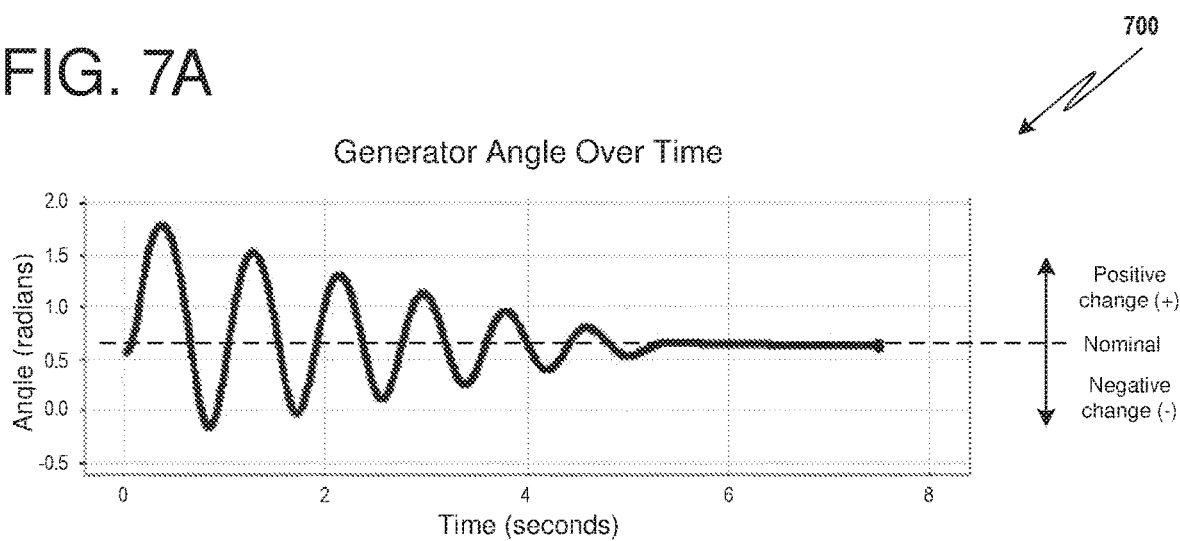
FIG. 7A is a graph illustrating measured rotor angle over time for a synchronous power generator of a hybrid generation system following a power system disturbance.
Figure 7B:
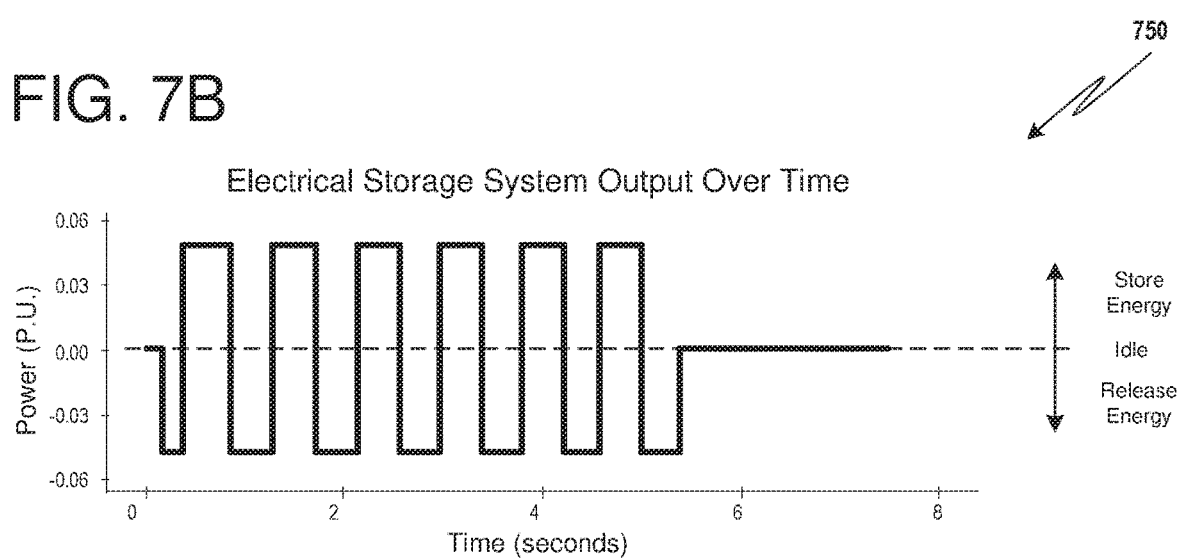
FIG. 7B is a graph illustrating output over time of an electrical storage system of the hybrid generation system following the power system disturbance.

FIGS. 7A-7B show results of a simulation of post-fault behavior of a hybrid generation system according to an embodiment of the disclosed subject matter. The simulation employed a single SPG coupled to a single ESS via a common local bus, which was connected to an infinite bus system via three transmission lines. Parameters for the simulation included 0.24 pu for the SPG transient reactance, 0.1 pu for the transformer reactance, 0.4 pu for the reactance per transmission line, 0.1 pu for the power system reactance, and 4 for the SPG inertia constant. The simulation included the following sequence of events: (1) in a pre-fault condition, the system operates at nominal frequency; (2) the system experiences a fault on one of the three transmission lines; and (3) after the fault clears at 0.15 s, two of the transmission lines and the resources (ESS, SPG, infinite bus) remain in service.

Without ESS damping control, the energy in the rotor of the SPG oscillates and the overall response is underdamped. With ESS damping control enabled, the overall system is positively damped. The oscillatory behavior of the modeled SPG is shown in the rotor angle profile 700 shown in FIG. 7A. The ESS is controlled to transfer the generator's energy from the positive angle change regions to the negative angle change regions so as to dampen the post-fault oscillations. To obtain such a response, the energy storage in (e.g., charging) and energy transfer from (e.g., discharging) the ESS is controlled in proportion to the change in SPG rotor angle. The resulting managed power output profile 750 is illustrated in FIG. 7B. The overall result from dynamic control of the ESS energy exchange is an improvement in recovery of the modeled power system's frequency following a disturbance.

In some embodiments, the ESS energy exchange to stabilize frequency oscillations in response to a disturbance can also act to compensate local voltage variations (e.g., in the local bus of the hybrid generation system or a small area of the electrical network coupled to the local bus). For example, if a variation in the power system frequency is due to a disturbance where transient load is greater than power generation, the energy exchange by the ESS to stabilize frequency can offset or otherwise mitigate a local voltage dip resulting from that disturbance. Other system benefits may also result from the power system frequency stabilization offered by the ESS energy exchange.

Although much of the discussion above has focused on rotor angle of the rotating SPG as the angle parameter for control of the ESS, torque angle or power angle of the rotating SPG can instead be used for control of the ESS. Accordingly, in the instances above describing control of the ESS based on rotor angles, such description also includes control based on torque angle and/or power angle, even if not specifically recited.

In some embodiments, the ESS can be used to add power-system stabilizing attributes to a variable or asynchronous (V/A) power generator, such as a photovoltaic or wind-turbine systems. In such embodiments, the V/A power generator would lack a rotor angle that can serve as a basis for control of the ESS energy exchange. However, the ESS can be controlled to provide energy exchange with the V/A power generator based on power system frequency (e.g., employing droop control) or based on a power angle (e.g., the angle between the voltage and current). Frequency responsive output from the V/A power generator alone may require sub-optimal operation of the underlying renewable resource for provision of power, thus wasting clean energy. Hybridizing the V/A power generator with an ESS, which is controlled for frequency response with active damping, can allow the wind or solar resource to deliver more net energy, while delivering grid-supportive inertia-equivalent (synthetic inertia) capability.

Figure 8:
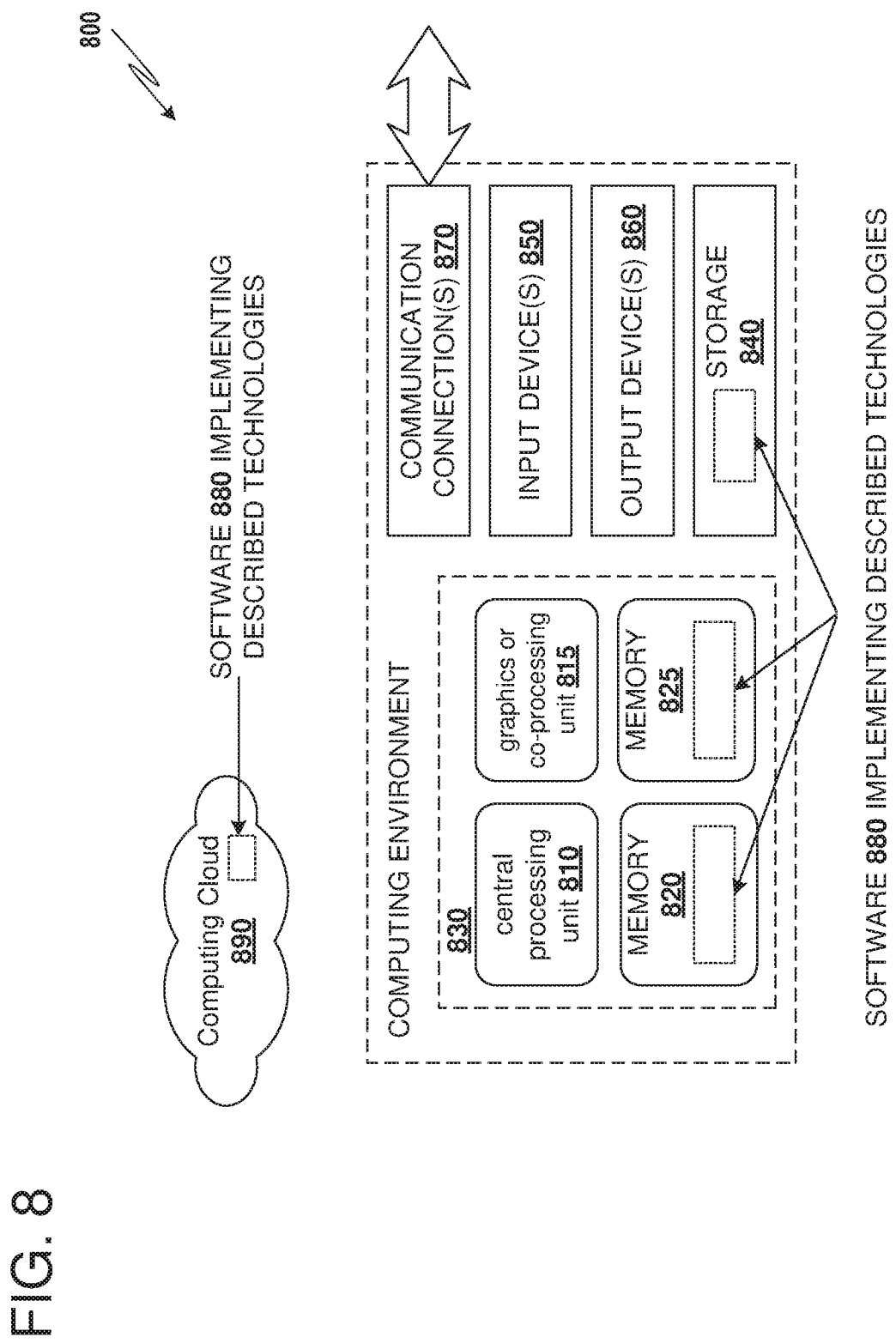
FIG. 8 depicts a generalized example of a suitable computing environment in which the described innovations may be implemented.

FIG. 8 depicts a generalized example of a suitable computing environment 800 in which the described innovations may be implemented. The computing environment 800 is not intended to suggest any limitation as to scope of use or functionality, as the innovations may be implemented in diverse general-purpose or special-purpose computing systems. For example, the computing environment 800 is any of a variety of computing devices (e.g., desktop computer, laptop computer, server computer, tablet computer, etc.).

The computing environment 800 includes one or more processing units 810, 815 and memory 820, 825. In FIG. 8, this basic configuration 830 is included within a dashed line. The processing units 810, 815 execute computer-executable instructions. Each processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s).

A computing system may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The tangible storage 840 may be removable or non-removable, and includes magnetic disks, magnetic tapes or cassettes, CD-ROMs, DVDs, or any other medium which can be used to store information in a non-transitory way, and which can be accessed within the computing environment 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing environment 800. The output device(s) 860 may be a display, printer, speaker, CD-writer, or another device that provides output from computing environment 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Some embodiments of the disclosed methods can be performed using computer-executable instructions implementing all or a portion of the disclosed technology in a computing cloud 890. For example, the disclosed methods can be executed on processing units 810, 815 located in the computing environment 830 and/or on servers located in the computing cloud 890.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). As used herein, the term computer-readable storage media does not include communication connections, such as signals, carrier waves, or other transitory signals. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASIC s), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

As used in this application the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items. Furthermore, as used herein, the term "and/or" means any one item or combination of items in the phrase.

The disclosed systems, methods, and apparatus are not limited to any specific aspect or feature or combinations thereof, nor do the disclosed things and methods require that any one or more specific advantages be present or problems be solved. Additionally, the description sometimes uses terms like "produce," "provide," "control," "receive," "evaluate," and "determine" to describe the disclosed methods. These terms are high-level descriptions of the actual operations that are performed. The actual operations that correspond to these terms will vary depending on the particular implementation and are readily discernible by one of ordinary skill in the art having the benefit of the present disclosure.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

In view of the many possible embodiments to which the principles of the disclosed technology may be applied, it should be recognized that the illustrated embodiments are only examples and should not be taken as limiting the scope of the claimed subject matter. We therefore claim as our invention all that comes within the scope of these claims.

We claim:

1. An apparatus comprising:
   an energy storage system coupled to an output of an electrical power generator; and
   a control system having a signal output coupled to the energy storage system that causes the energy storage system to store or release energy based on at least one angle parameter of the electrical power generator, each angle parameter being selected from rotor angle, torque angle, and power angle of the electrical power generator, the control system being configured to provide active frequency damping of electrical power output by the electrical power generator, the control system being configured to:
   control the energy storage system to store energy in response to a positive change over time of the at least one angle parameter, and
   control the energy storage system to release stored energy in response to a negative change over time of the at least one angle parameter.

2. The apparatus of claim 1, wherein the control system comprises:
   one or more processors;
   an input/output interface situated to control the energy storage system; and
   computer-readable storage storing computer-executable instructions that, when executed by the one or more processors, cause the one or more processors to collectively control the energy storage system to store or release energy based on the at least one angle parameter.

3. The apparatus of claim 1, wherein the active frequency damping is performed by controlling energy storage or release by the energy storage system.

4. The apparatus of claim 1, wherein the control system is configured to control energy storage or release by the energy storage system so as to stabilize a frequency of electrical power output at a nominal value or within a frequency range around the nominal value.

5. The apparatus of claim 1, wherein:
   the energy storage system comprises an inverter or flexible alternating current transmission system (FACTS) and at least one of a battery, a capacitor, a flywheel, a stationary power source, a pumped fluid storage, or a thermal energy storage; and
   the electrical power generator comprises at least one of a steam generator, a combustion turbine generator, a combined cycle generator, a hydroelectric generator, or a diesel or natural gas engine generator.

6. The apparatus of claim 1, wherein the control system has a signal input coupled to the electrical power generator to receive sensor signals indicative of the at least one angle parameter.

7. The apparatus of claim 1, wherein the control system is configured to control the energy storage system such that an amount of energy stored or released is a function of at least one of:
   a magnitude of the at least one angle parameter;
   a difference between the magnitude of the at least one angle parameter and a nominal value; or
   a rate of change of the at least one angle parameter.

8. The apparatus of claim 1, wherein the energy storage system is coupled to the output of the electrical power generator via a local bus.

9. A method for operating an energy storage system coupled to an electrical power generator, the method comprising:
in a first operation mode, controlling storage of energy in or release of stored energy from the energy storage system based on a measurement of at least one angle parameter of the electrical power generator, the angle parameter being selected from rotor angle, torque angle, and power angle of the electrical power generator, the controlling comprising:
controlling the energy storage system to store energy in response to a positive change of the at least one angle parameter during a measurement time interval, and
controlling the energy storage system to release stored energy in response to a negative change of the at least one angle parameter during the measurement time interval.

10. The method of claim 9, wherein the controlling provides active frequency damping of electrical power from the electrical power generator.

11. The method of claim 9, wherein the controlling is such that a frequency of electrical power output from a combination of the energy storage system and the electrical power generator is stabilized at a nominal value or within a frequency range around the nominal value.

12. The method of claim 9, wherein the energy storage system comprises:
an inverter or flexible alternating current transmission system (FACTS); and
at least one of a battery, a capacitor, a flywheel, a stationary power source, a pumped fluid storage, or a thermal energy storage.

13. The method of claim 9, further comprising:
receiving at least one sensor signal from the electrical power generator or a power management unit thereof, wherein the at least one sensor signal is indicative of the at least one angle parameter, or is indicative of changes of the at least one angle parameter over time,
wherein the controlling is responsive to the at least one sensor signal.

14. The method of claim 9, wherein the controlling is such that an amount of energy stored in or released from the energy storage system is a function of at least one of:
a magnitude of the at least one angle parameter;
a difference between the magnitude of the at least one angle parameter and a nominal value; or
a rate of change of the at least one angle parameter.

15. The method of claim 9, further comprising:
in a second operation mode, controlling the storage of energy in or release of stored energy from the energy storage system based on power frequency variations in an electrical network coupled to the electrical power generator,
wherein the energy storage system is operated in the second operation mode in response to an absence of the measurement of the at least one angle parameter, or to the measurement of the at least one angle parameter being outside a predetermined range.

16. The method of claim 15, wherein, in the second operation mode, the controlling is such that an amount of energy stored in or released from the energy storage system is proportional to a frequency of the power in the electrical network or a difference between the frequency of the power and a nominal value.

17. The method of claim 9, further comprising:
prior to initiation of the first operation mode, determining that a frequency of power in an electrical network coupled to the electrical power generator is outside of predetermined range.

18. The method of claim 9, wherein the electrical power generator is a synchronous power generator comprising at least one of a simple cycle steam generator, a combustion turbine generator, a combined cycle generator, a hydroelectric generator, or a diesel or natural gas engine generator.

19. Non-transitory computer-readable storage media storing computer-readable instructions that, when executed by one or more processors, cause the one or more processors to perform a method using a controller configured to control a hybrid energy storage system comprising an electrical power generator, the instructions comprising:
instructions that cause the one or more processors to receive one or more sensor signals indicative of a measurement of at least one angle parameter of the electrical power generator, the at least one angle parameter being selected from rotor angle, torque angle, and power angle of the electrical power generator, or of changes in the at least one angle parameter over a measurement time interval;
instructions that cause the one or more processors to, in a first operation mode, perform controlling storage of energy in or release of stored energy from the energy storage system based on the measurement of at the least one angle parameter of the electrical power generator, the controlling comprising:
controlling the energy storage system to store energy in response to a positive change of the at least one angle parameter during a measurement time interval, and
controlling the energy storage system to release stored energy in response to a negative change of the at least one angle parameter during the measurement time interval;
instructions that cause the one or more processors to generate one or more first control signals for the energy storage system that cause the energy storage system to store energy in response to the positive change in the at least one angle parameter during the measured time interval; and
instructions that cause the one or more processors to generate one or more second control signals for the energy storage system that cause the energy storage system to release stored energy in response to the negative change in the at least one angle parameter during the measured time interval.

20. A control system comprising:
the one or more processors; and
the non-transitory computer-readable storage media of claim 19.

21. A hybrid power generation system comprising:
an electrical power generator configured to produce alternating current (AC) electrical power for an electrical network; and
a frequency damping unit coupled to the electrical power generator, the frequency damping unit comprising an energy storage system and a controller,
wherein the controller is configured to control the energy storage system to modulate a combined power output of the electrical power generator and the energy storage system based on at least one angle parameter of the electrical power generator, each angle parameter being selected from rotor angle, torque angle, and power angle of the electrical power generator, the controller being further configured to:
control the energy storage system to store energy in response to a positive change of the at least one angle parameter during a time period, and
control the energy storage system to release stored energy in response to a negative change of the at least one angle parameter during the time period.

22. The hybrid power generation system of claim 21, wherein:
the electrical power generator has a physical inertia; and
the frequency damping unit is configured to add synthetic inertia to the physical inertia of the electrical power generator.

23. The hybrid power generation system of claim 22, wherein the synthetic inertia added by the frequency damping unit acts to stabilize a frequency of the combined power output at a nominal value of the electrical network or within a frequency range around the nominal value.

24. The hybrid power generation system of claim 21, wherein an effective equal area criterion for stability limit of the hybrid power generation system is greater than an effective equal area criterion for stability limit of the electrical power generator alone.

25. The hybrid power generation system of claim 21, further comprising:
one or more sensors configured to measure the at least one angle parameter and to generate one or more sensor signals in response to the at least one measured angle parameter,
wherein the controller is configured to control the energy storage system based on the one or more sensor signals.

26. The hybrid power generation system of claim 21, wherein the electrical power generator is a synchronous power generator comprising at least one of a simple cycle steam generator, a combustion turbine generator, a combined cycle generator, a hydroelectric generator, a diesel engine generator, or a natural gas engine generator.

27. The hybrid power generation system of claim 21, wherein the energy storage system comprises:
an inverter or flexible alternating current transmission system (FACTS); and
at least one of a battery, a capacitor, a flywheel, a stationary power source, a pumped fluid storage, or a thermal energy storage.

28. The hybrid power generation system of claim 21, wherein the controller is configured to control the energy storage system such that an amount of energy stored in or released from the energy storage system is a function of at least one of:
a magnitude of the at least one angle parameter of the electrical power generator;
a difference between the magnitude of the at least one angle parameter and a predetermined value; or
a rate of change of the at least one angle parameter.

29. The hybrid power generation system of claim 21, wherein:
the frequency damping unit is coupled to the electrical power generator by one or more local buses; and
the electrical power generator is coupled to the electrical network by one or more power transmission lines.

30. An electrical power system comprising:
one or more of the hybrid power generation systems of claim 21;
one or more variable or asynchronous (V/A) power generation systems; and
an electrical network coupled to the hybrid and V/A power generation systems and configured to transmit power from the power generation systems to one or more end users.

31. The electrical power system of claim 30, wherein:
in each hybrid power generation system, the frequency damping unit is coupled to the corresponding electrical power generator by one or more local buses; and
each of the hybrid and V/A power generation systems is coupled to the electrical network by one or more respective power transmission lines.

32. The electrical power system of claim 30, wherein the one or more V/A power generation systems comprises at least one of a wind turbine or a photovoltaic device.

* * * * *